United States Patent [19]

Kataoka

[11] Patent Number: 5,452,073
[45] Date of Patent: Sep. 19, 1995

[54] MULTI-IMAGE FORMING APPARATUS HAVING REGISTRATION ERROR CORRECTION

[75] Inventor: Tatsuhito Kataoka, Tokyo, Japan

[73] Assignee: Canon Kabushiki Kaisha, Tokyo, Japan

[21] Appl. No.: 357,787

[22] Filed: Dec. 16, 1994

Related U.S. Application Data

[63] Continuation of Ser. No. 4,565, Jan. 14, 1993, abandoned.

[30] Foreign Application Priority Data

Jan. 14, 1992 [JP] Japan ................... 4-023348

[51] Int. Cl.$^6$ ............................. G03G 15/00
[52] U.S. Cl. ................... 355/271; 347/116
[58] Field of Search .......... 355/204, 208, 317, 326 R, 355/271, 327; 358/526; 347/116, 232, 248

[56] References Cited

U.S. PATENT DOCUMENTS 4,903,067 2/1990 Murayama et al. ............. 346/160

FOREIGN PATENT DOCUMENTS 2-44377 2/1990 Japan ................... 355/317

*Primary Examiner*—Joan H. Pendegrass
*Attorney, Agent, or Firm*—Fitzpatrick, Cella, Harper & Scinto

[57] ABSTRACT

An image forming apparatus includes plural imaging stations each having an image forming unit positioned around a photosensitive drum, a transfer belt for transporting a recording sheet, a pattern forming unit for causing the image forming unit of each imaging station to form registration correcting marks of plural sets on the transfer belt at predetermined timings, a reader unit for reading the registration correcting marks formed on the transfer belt, a calculation unit for applying a predetermined calculation to the data read from the registration correcting marks on the transfer belt, a memory for storing the result of calculation for respective colors, and a correcting unit for mechanically or electrically correcting the registrations of the imaging stations by analysis of the data stored in the memory.

37 Claims, 12 Drawing Sheets

MULTI-IMAGE FORMING APPARATUS HAVING REGISTRATION ERROR CORRECTION

This application is a continuation of application Ser. No. 08/004,565 filed Jan. 14, 1993, now abandoned.

BACKGROUND OF THE INVENTION

1. Field of the Invention

The present invention relates to an image forming apparatus for superposing, in succession on a recording medium, plural images formed by plural image forming means.

2. Related Background Art

There are already commercialized recording apparatus irradiating a photosensitive drum with a laser beam modulated according to recording information, developing an electrostatic latent image formed on the photosensitive drum by the electrophotographic process and transferring the developed image onto a recording sheet. Also for forming a color image, there is already proposed image forming apparatus which is equipped with a plurality of such recording apparatus and in which a recording sheet is transported by a transfer belt in succession to said recording apparatus and the images of different colors are transferred in superposition onto said recording sheet.

In such image forming apparatus, the images of different colors may become misregistered at the formation of electrostatic latent images on the respective photosensitive drums and at the transfer of the toner images, formed on the photosensitive drums, memory capacity, leading to a technical drawback of increased magnitude of circuitry and an economic drawback of increased cost of the apparatus.

SUMMARY OF THE INVENTION

An object of the present invention is to resolve the drawbacks mentioned above.

Another object of the present invention is to provide an image forming apparatus capable of exactly calculating the information on registration errors of the image bearing members with a limited memory capacity and without influence of unevenness in the rotation of the image bearing members, thereby precisely correcting the errors in the registration of the image bearing members.

According to the present invention, plural registration correcting marks are formed on a transporting member within a turn of each image bearing member, then a calculation process is applied to thus formed plural registration correction marks and the results of said calculation process are memorized.

The image forming apparatus of the present invention comprises plural imaging stations including image forming means positioned around endless image bearing members moved by plural image bearing member drive systems; a transport member for transporting a recording material in succession in a predetermined onto the recording sheet supported on the transfer belt, because of the error in the mechanical mounting of the respective photosensitive drums, the error in the optical path lengths of the respective laser beams, the variation in the optical paths etc. For this reason it has been conceived to effect correction by forming registration correcting pattern images on the transfer belt from the respective photosensitive drums and reading said pattern images for example with a CCD sensor. The correction for the variation in the optical path length or in the optical path can be achieved by calculating the registration errors on the photosensitive drums and electrically correcting the image signals to be recorded and/or driving mirrors provided in the optical paths of the laser beams.

More specifically, the error in registration of the different colors is obtained by reading the registration correcting pattern images, formed on the transfer belt, by means of the CCD sensor, storing the obtained pattern image data in a memory, and effecting calculation on the pattern images stored in said memory. Consequently, in case of forming plural registration correcting pattern in a turn of the photosensitive drum for the purpose of eliminating wow and flatter components in the rotation thereof, it is required to read and store such plural images in the memory. For this reason there is required an enormous direction by plural transport member driving systems; pattern forming means for causing the image forming means in each imaging station to form, on the transport member transported in a turn of each image bearing member, registration correcting marks of plural sets or corresponding to plural turns at predetermined timings; reading means for reading the registration correcting marks of plural sets or corresponding to plural turns, transferred onto the transport member by said pattern forming means; calculation process means for applying predetermined calculation process on the read data of said registration correcting marks of plural sets or corresponding to plural turns, released from said reading means; memory means for storing, for each imaging station, the result of calculation by said calculation process means; and correction means for mechanically or electrically correcting the registration of each imaging station, through analysis of the result of calculation stored in said memory means.

According to the present invention, when the pattern forming means causes each image forming means to form registration correcting marks of plural sets or corresponding to plural turns on the transport member at predetermined timings, the reading means initiates the reading of said registration correcting marks of plural sets and of plural turns transferred onto the transport member, and the calculation process means applies predetermined calculation process to the read data. The obtained result is stored, for each color, by the memory means, and the correction means analyzes the stored result and corrects the registration of each imaging station in mechanical or electrical manner. It is therefore rendered possible, even with a limited memory capacity, to exactly calculate the information on the registration errors of the image bearing members without the influence of unevenness in the rotation thereof, thereby precisely correcting the registration errors of the image bearing members.

DETAILED DESCRIPTION OF THE PREFERRED EMBODIMENTS

Now the present invention will be clarified in detail by preferred embodiments thereof shown in the attached drawings.

Figure 1:
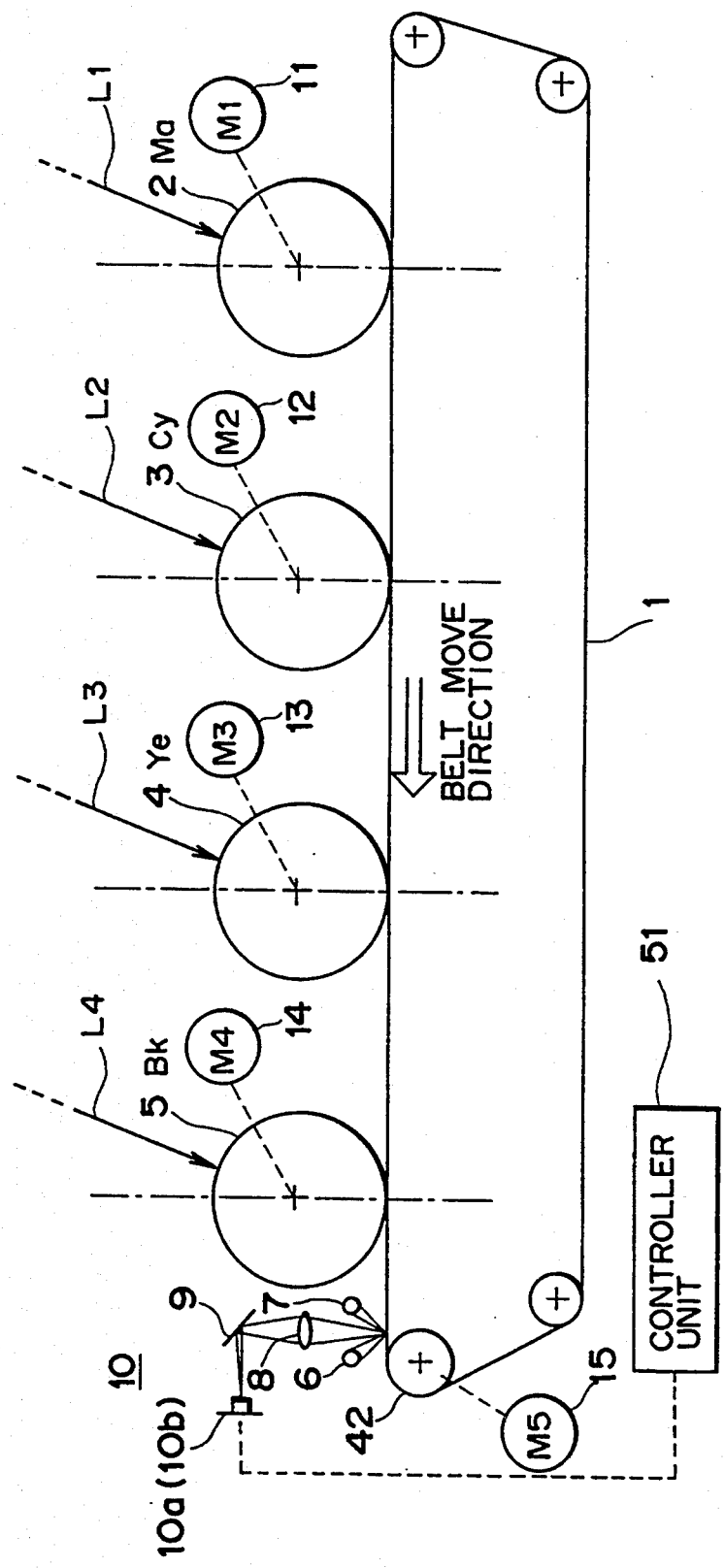
FIG. 1 is a schematic view of an image forming apparatus constituting an embodiment of the present invention.

FIG. 1 is a schematic view of an image forming apparatus constituting an embodiment of the present invention, wherein a transfer belt 1 is driven, by the driving force of a stepping motor 15 transmitted to a driving roller 42, in a direction indicated by an arrow in the center, at a predetermined speed or a lowered speed, according to the different operating modes to be explained later. Photosensitive drums 2–5 respectively form electrostatic latent images by the scanning with laser beams LM(L1), LC(L2), LY(L3), LBK(L4) corresponding to magenta (M), cyan (C), yellow (Y) and black (BK) colors. Said latent images are rendered visible by toners contained in unrepresented developing units, and are transferred onto the transfer belt 1 or a recording sheet supported thereon. Drum motors 11–14 rotate the photosensitive drums 2–5 at a predetermined speed. The pattern forming means of the present invention reads predetermined pattern data for registration correction, stored for example in an unrepresented ROM, modulates the laser beams LM, LC, LY, LBK according to said pattern data, thereby forming latent images of paired patterns in axially different two predetermined positions on each of the photosensitive drums 2–5, then develops said latent images with the toners of magenta (M), cyan (C), yellow (Y) and black (BK) colors and transfers thus developed images onto the transfer belt 1. In the present embodiment, the patterns are formed in a pair or in a larger number, in predetermined positions in the transversal direction perpendicular to the transport direction of the transfer belt 1.

The reading means 10 is composed of illuminating lamps 6, 7, a condenser lens 8, a mirror 9, and sensors 10a, 10b composed of CCD's, and reads the patterns by focusing, on the sensors 10a, 10b, the reflected light obtained by illuminating the patterns (for example cross-shaped marks of a predetermined width) formed on the transfer belt 1 driven by the stepping motor 15. A controller unit 51 integrally controls the ordinary image formation, the formation of registration correcting patterns and the reading thereof, according to a control program stored for example in a ROM.

In the image forming apparatus of the above-explained configuration, the pattern forming means (a patch forming unit in the controller unit 51) causes each image forming means to form, on the transport member, registration correcting marks of plural sets per rotation of the photosensitive drum, for plural rotations thereof at predetermined timings. Then the reading means 10 initiates the reading of the registration correcting marks of plural sets corresponding to plural rotations, transferred onto the transport member (transfer belt 1), then the calculation process means (controller unit 51) applies a predetermined calculation process to the read data, and the obtained result is stored, for respective colors, in memory means (RAM 603,604 to be explained later). The correction means (controller unit 51 in the present embodiment) analyzes the stored results of calculation, and corrects the registration of each imaging station in electrical or mechanical manner. It is thus rendered possible, even with a limited memory capacity, to exactly calculate the information on the registration errors of the image bearing members without the influence of unevenness in the rotation thereof, thereby precisely correcting the registration errors of the image bearing members. In the present embodiment, the correction means achieves the registration of the respective photosensitive drums by correcting the position of a mirror in the scanning optical system (provided for each photosensitive drum) through stepping motors 23–26 to be explained later and by electrically correcting the scanning timing of the laser beams.

In the following there will be explained the image forming operations.

The photosensitive drums 2–5, respectively corresponding to magenta (M), cyan (C), yellow (Y) and black (BK) are respectively rotated by drum motors 11–14, and are uniformly charged by unrepresented charging units. Said drums 2–5 are irradiated by laser beams L1–L4 modulated by video signals to thereon form respectively electrostatic latent images, which are developed into visible images by unrepresented developing units.

The visible images formed on said drums 2–5 are transferred onto a recording sheet, which is fed from an unrepresented sheet feeding unit and is electrostatically attracted to the transfer belt 1, at predetermined timings. Said recording sheet is transported in a direction indicated by an arrow, by means of the stepping motor 15, then is subjected to image fixation in a fixing unit and is discharged.

In the following there will be explained the reading of registration correcting pattern imrges.

Figure 2:
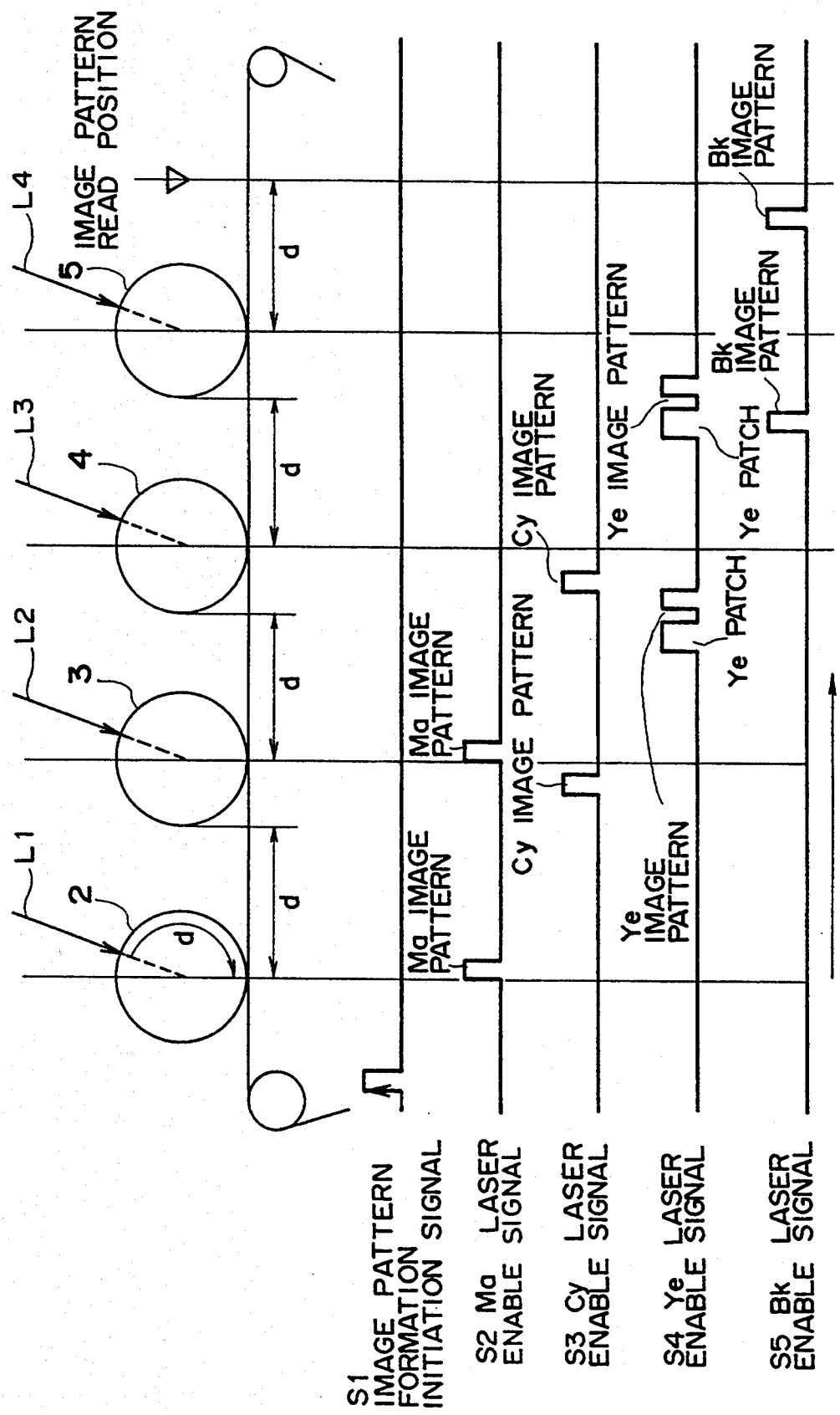
FIG. 2 is a timing chart showing the timings of pattern image writing in the image forming apparatus shown in FIG. 1.

The visible pattern images formed on the photosensitive drums 2–5 by a pattern image forming circuit are respectively transferred onto the transfer belt 1 at the timings shown in a timing chart in FIG. 2, and move as indicated by an arrow. Thus moving pattern images are read, in succession, through an optical system consisting of the illuminating lamps 6, 7, condenser lens 8 and mirror 9 and by the CCD sensors 10 consisting of sensors 10a, 10b.

Figure 3:
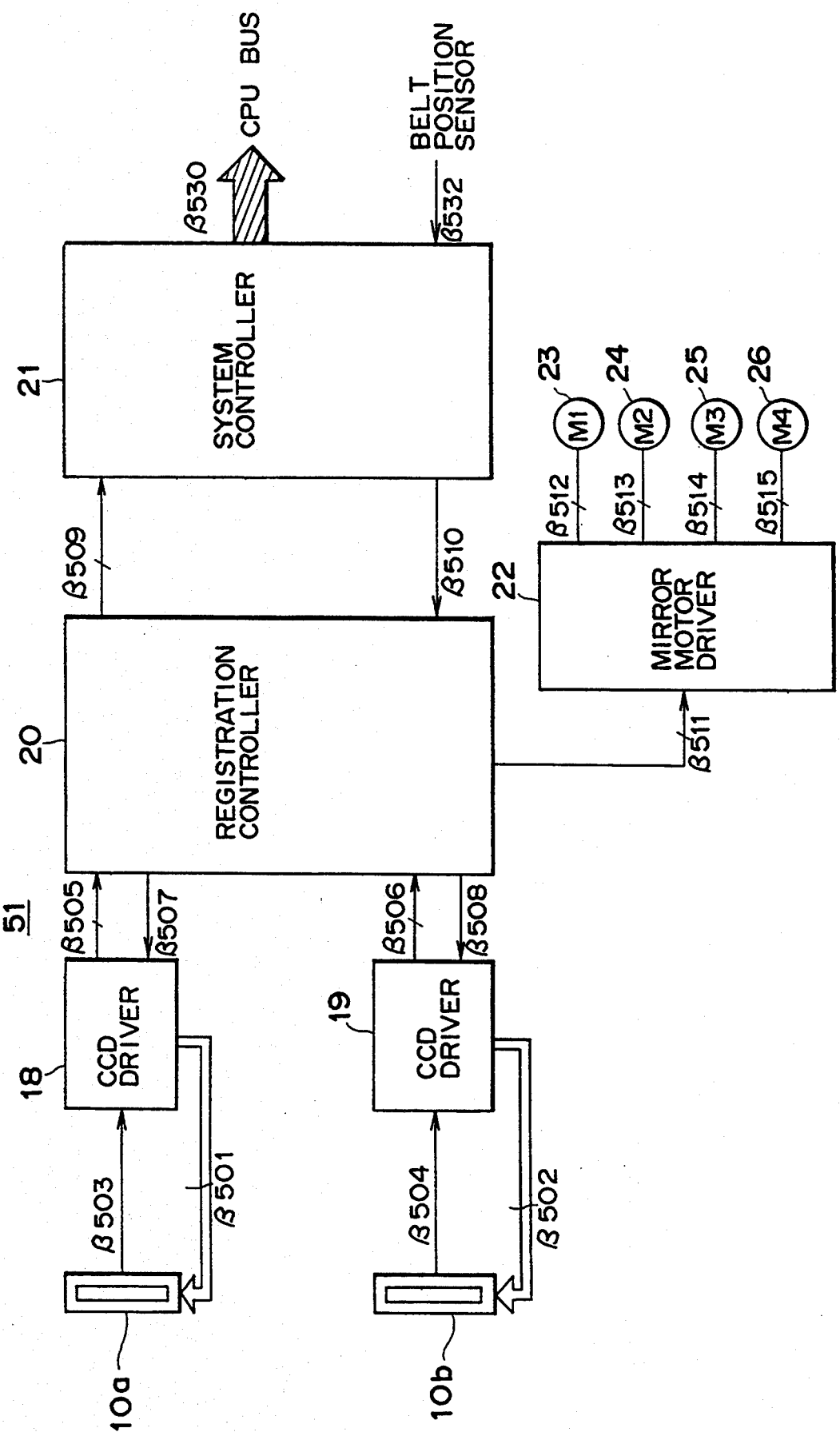
FIG. 3 is a detailed block diagram of a controller unit shown in FIG. 1.

FIG. 3 is a detailed block diagram of the controller unit 51 shown in FIG. 1, of which structure and functions will be explained in the following.

Figure 4:
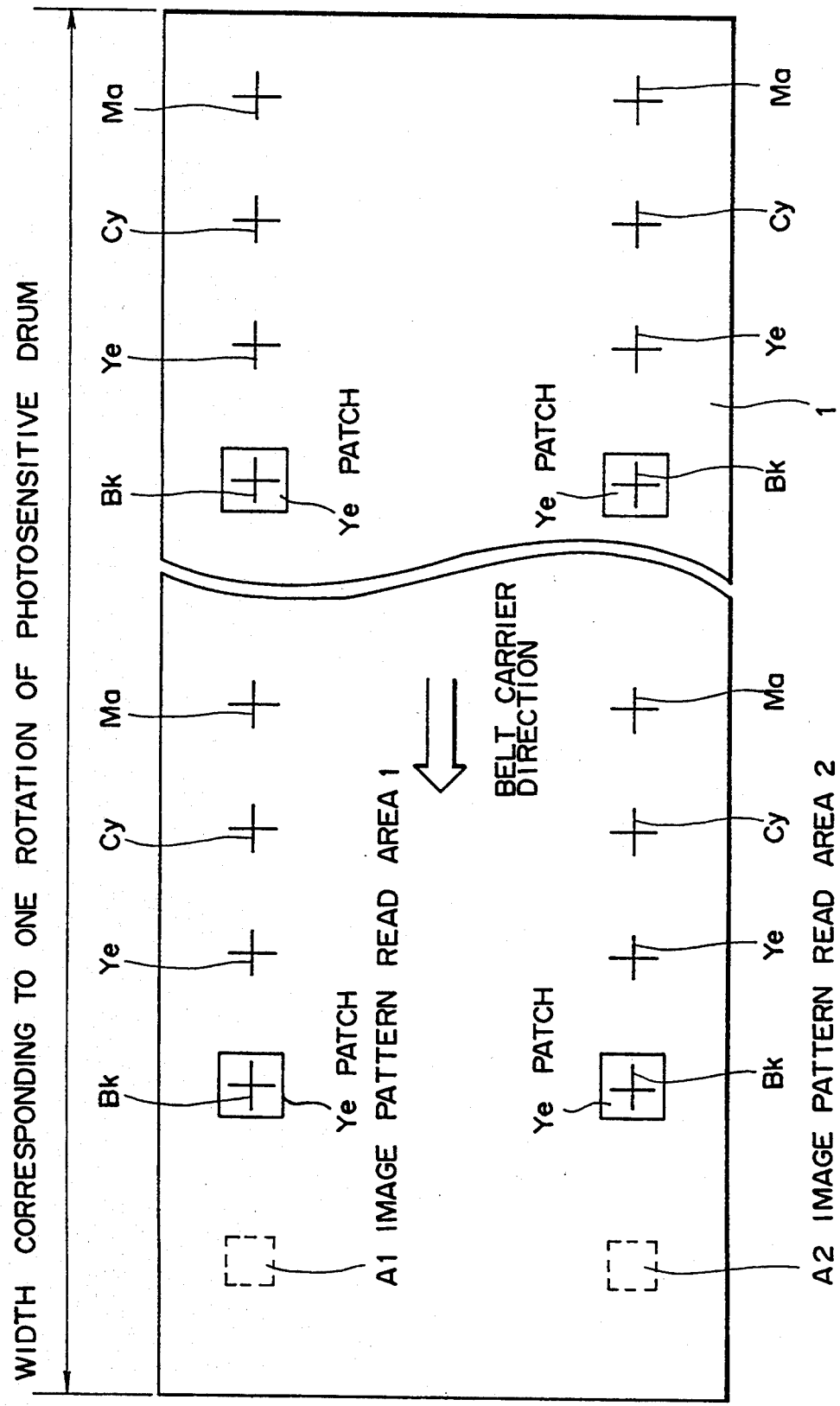
FIG. 4 is a plan view showing pattern images transferred onto a transfer belt shown in FIG. 1.

The pattern images of respective colors, formed in vertically different positions on the transfer belt 1 as shown in FIG. 4, are respectively read by the CCD sensors 10a, 10b. A registration controller 20 sends original clock signals $\beta507$, $\beta508$ to CCD drivers 18, 19 which generate clock pulses β501, β502 (transfer pulses, reset pulses, shift pulses etc.) required for driving the CCD sensors 10a, 10b and sends said pulses to said CCD sensors. The pattern image signals read by the CCD sensors 10a, 10b are subjected to the processes of amplification, DC generation and A/D conversion in the CCD drivers 18, 19 and are supplied, as digital signals β505, β506, to the registration controller 20. The pattern image signals of respective colors, received by the registration controller 20, are subjected to a pattern recognition process for registration correction. Thereafter plural recognition process data are stored in the memory, and, with the pattern images of a particular color taken as the reference, there are calculated the registration errors of the pattern images of other colors. Thus data β509 for setting the timing of electrical image writing in the main and sub scanning for respective colors are supplied to a system controller 21, and pulse data β511 for stepping motors 23, 24, 25, 26 for driving reflection mirrors in FIG. 12 which are provided in the optical paths of the recording laser beams for correcting the variation in the optical path lengths and in the optical paths are supplied to a mirror motor driver 22. Said mirror motor driver 22 supplies the stepping motors 23–26 with current signals according to said pulse data β511, thereby driving said stepping motors and thus positioning the reflection mirrors in FIG. 12. These corrections for the registrations are executed in response to a start signal β510 supplied from the system controller 21 to the registration controller 20.

Figure 5:
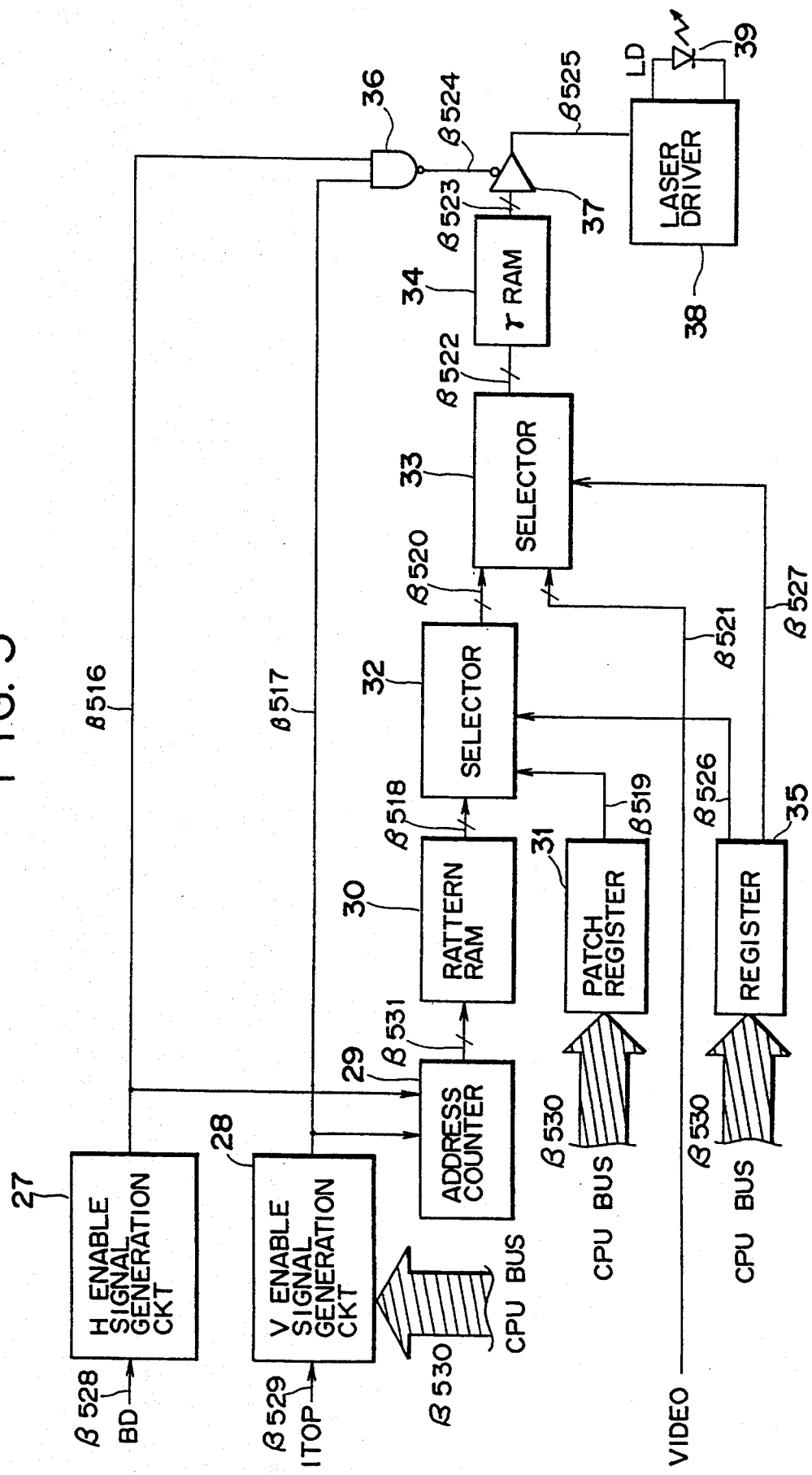
FIG. 5 is a block diagram of a pattern forming unit in the image forming apparatus shown in FIG. 1.

FIG. 5 is a block diagram of the pattern forming unit in the image forming apparatus shown in FIG. 1, and the structure and functions of said unit will be explained in the following.

A beam detection signal β528 obtained by detecting the laser beam outside the recording area and serving as a synchronization signal in the main scanning direction is supplied to an enable signal generation circuit in the main scanning direction (H enable signal generation circuit) 27, which generates an H-enable signal β516 for the registration correcting image pattern signal.

Also a start signal (ITOP) β529 for the formation of registration correcting image patterns is supplied to an enable signal generation circuit 28 in the sub scanning direction (V-enable signal generation circuit), which generates V-enable signal β517 for the image pattern signal of respective colors. The H-enable signal β516 and the V-enable signal β517 are supplied to an address counter 29, which generates an address signal β531 for the pattern RAM 30 for the registration correcting image. In response to said address signal β531, the image pattern RAM 30 releases an image pattern signal β518 (corresponding to a cross-shaped pattern in the present embodiment). A patch register 31 stores data, supplied from the system controller 21 through a CPU bus β530, of patches to be formed under the registration correcting pattern images. Said patch data signal β519 and the image pattern signal β518 are supplied to a selector 32, which also receives a selection signal β526 in order to always release the image pattern signal β518 for the magenta (M) or cyan (C) color. For the yellow (Y) or black (BK) color, a signal β520 in which the image pattern data and the patch data are switched according to the predetermined timings, as shown in FIG. 2, by a register 35 controlled through the CPU bus β530, is supplied to a selector 33, which also receives the video signal β521. In case the black toner is composed of carbon black, the reflective optical system is unable to read the pattern image because carbon black absorbs light. For this reason, a patch (a solid colored area) is formed with any of other light-reflecting toners (magenta, cyan and yellow; yellow toner being selected in the present embodiment) in advance on the transfer belt 1, at the formation of yellow registration correcting image pattern, and the black registration correcting image pattern is formed on thus formed patch of yellow toner.

Consequently, in a mode for forming the image pattern and the patch, a selection signal β527 selects the image pattern and the patch, whereby the selected image information β522 is supplied to a γRAM 34 and γ-transformed image information β523 is supplied, through a gate circuit 37, as a video signal β525 to a laser driver 38. The laser driver 38 also receives an image signal β524, through a NAND gate 36. A semiconductor laser 39 is on/off modulated according to the image signal β524 or the video signal β525 supplied to the laser driver 38, whereby latent images are formed on the photosensitive drums 2–5 through unrepresented optical scanning systems.

In the present embodiment, a pattern generating circuit is provided for each color, but the pattern RAM 30 etc. may be used in common for different colors.

In the following there will be given an explanation on the process for calculating the pattern position and the pattern shape for respective colors, with reference to FIGS. 6 and 7.

Figure 6:
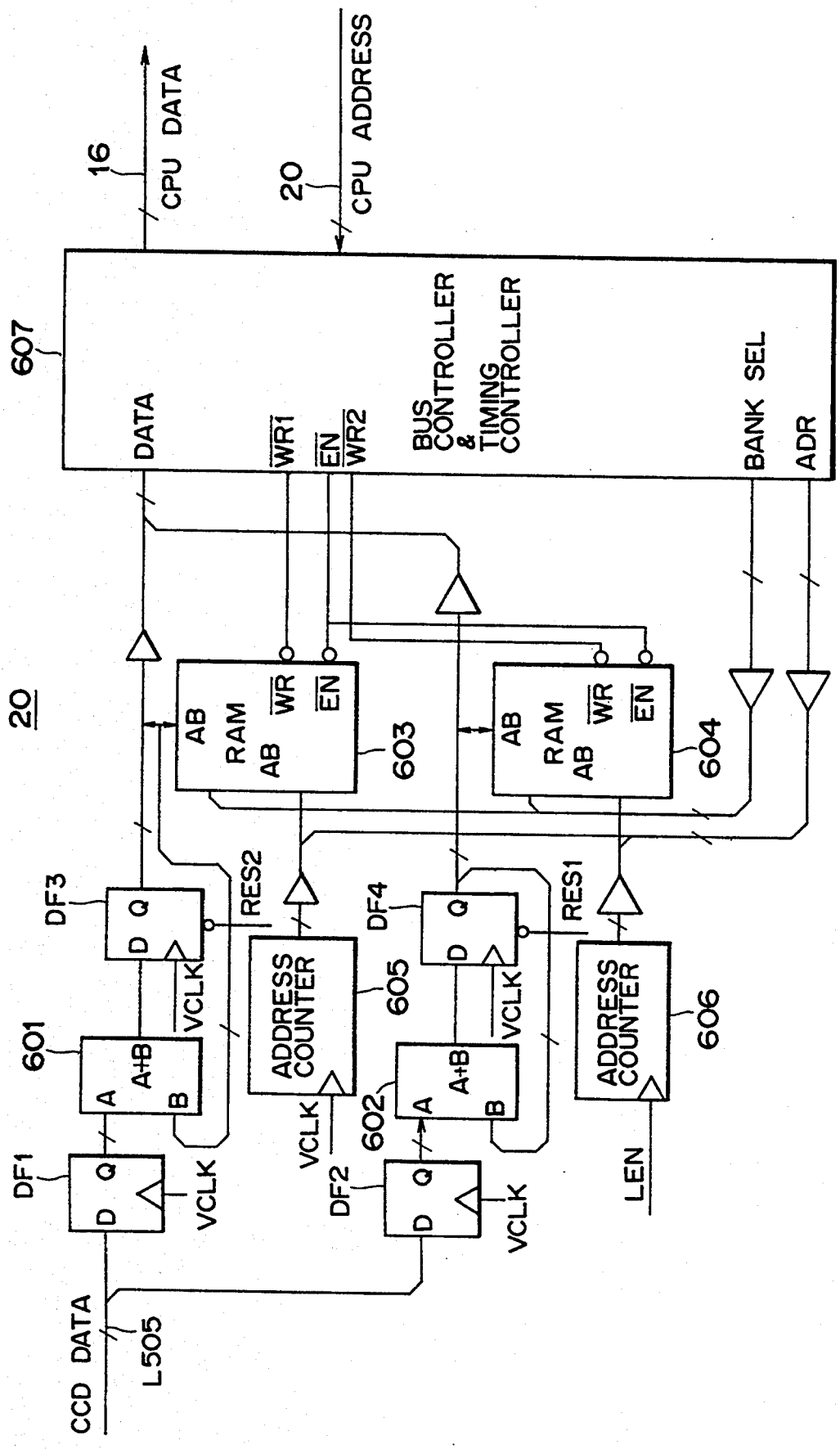
FIG. 6 is a detailed block diagram of the principal part of a registration controller shown in FIG. 3.

FIG. 6 is a detailed block diagram showing the principal part of the registration controller 20 shown in FIG. 3.

Figure 7:
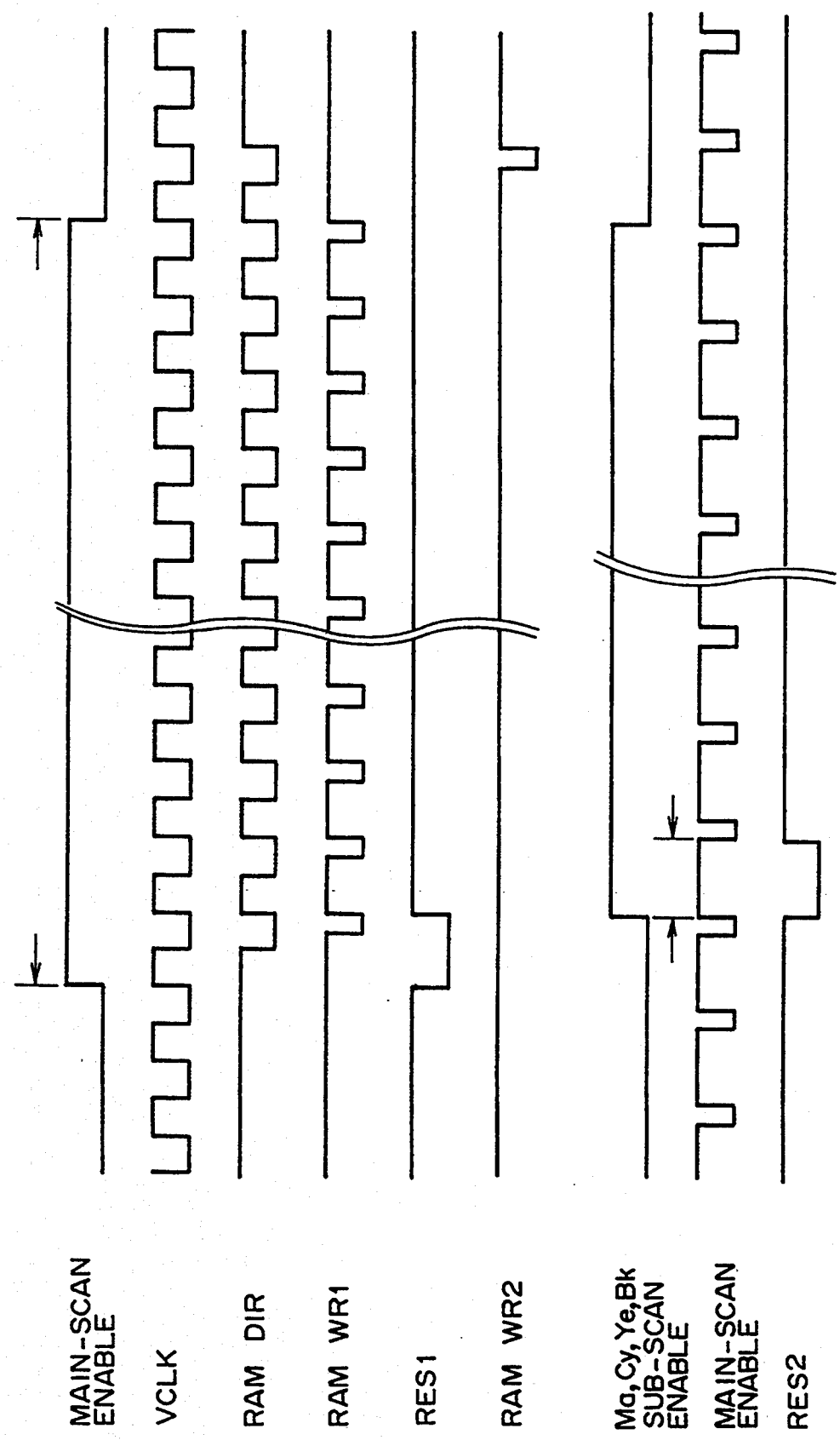
FIG. 7 is a timing chart showing the function of the circuit shown in FIG. 6.

Referring to FIG. 6, there are shown D-flip-flops DF1–DF4; adders 601, 602 for adding inputs A and B; a RAM 603 for storing density histograms of respective colors in the sub scanning direction, at timings according to a timing chart shown in FIG. 7; a RAM 604 for storing density histograms of respective colors in the main scanning direction, at timing according to a timing chart shown in FIG. 7; and a bus controller 607 for releasing various timing signals and a bank selection signal BANKSEL.

The present embodiment prepares density histograms in the pixels of the read pattern data, in each of the main and sub scanning directions, and recognizes the pattern position and the pattern shape of respective colors according to thus prepared histogram data.

At first the density histogram in the main scanning direction can be prepared, after initializing with a reset signal RES1, by adding pattern data of a main scanning line, released for example from the CCD sensor 10a, by means of the adder 602, and is stored in the RAM 604 in synchronization with a write signal RAMWR2, in an address determined by an address counter 606 based on a main scanning enable signal LEN released at a timing shown in FIG. 7. The memory is enabled during the release of a sub scanning enable signal.

Figure 8:
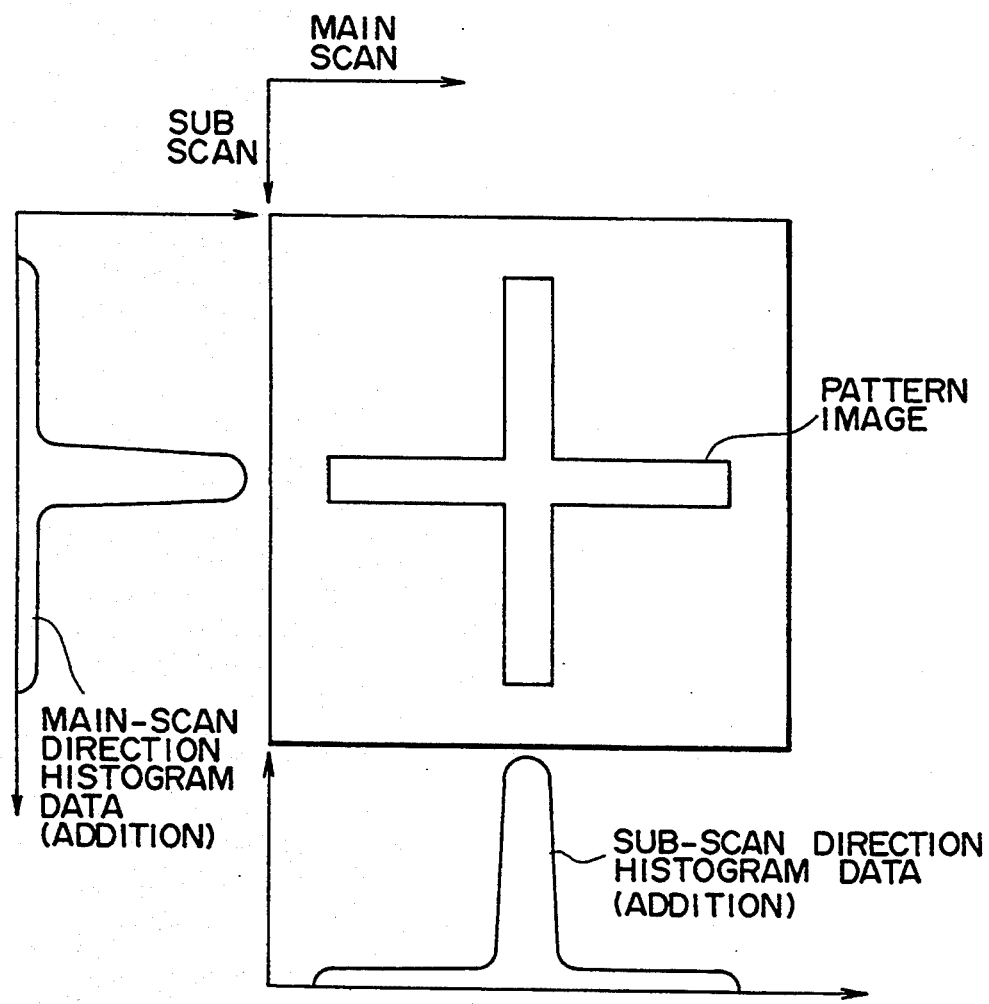
FIG. 8 is a chart showing histograms obtained from pattern images transferred onto the transfer belt shown in FIG. 1.

On the other hand, the density histogram in the sub scanning direction is prepared, after the pattern data of a main scanning line are cleared by a reset signal RES2, repeating read-and-modified write operations for each pixel in response to a write signal RAMWR1 and a data direction switching signal RAMDIR, thus storing, in the RAM 603, the histogram data of each sub scanning line, for each pixel added by the adder 601. AS a result, the histogram data of the main and sub scanning directions, corresponding to the pattern image as shown in FIG. 8, are stored, for respective colors, in the RAM's 603, 604. The memory space is divided by shifting the banks of different colors and those of different sets to the upper position of the RAM's by the bank selection signal BANKSEL.

In the following the registration correcting process in the image forming apparatus of the present invention will be explained, with reference to a flow chart shown in FIG. 9.

Figure 9:
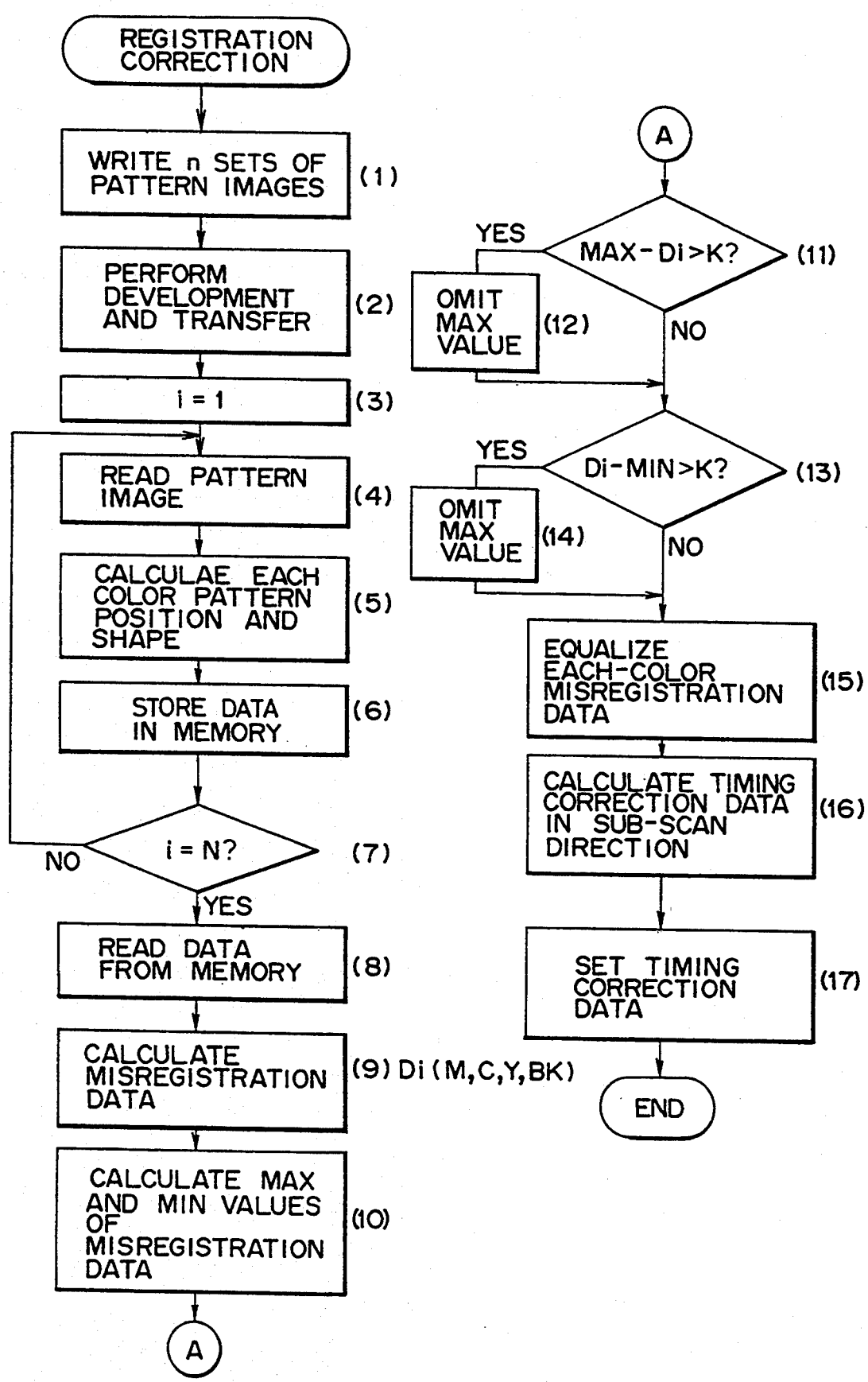
FIG. 9 is a flow chart showing an example of the registration correcting procedure in the image forming apparatus of the present invention.

FIG. 9 is a flow chart showing an example of the registration correcting process, wherein (1) to (17) indicate the process steps.

At first the pattern images of n sets, that can be formed during a rotation of the photosensitive drum, are written, by the pattern forming unit shown in FIG. 5, in each of the photosensitive drum 2-5 corresponding to respective colors (1), and the resulting electrostatic latent images are developed and transferred onto the transfer belt 1 (2). Subsequently a parameter i is set at "1" (3), and pattern images of a first set of respective colors, transported in succession to a pattern image reading position (pattern reading areas A1, A2 indicated by broken lines in FIG. 4), are read by the reading unit equipped with the CCD sensors 10a, 10b shown in FIG. 3 (4). Based on thus obtained and processed digital signals $\beta 505$, $\beta 506$, the registration controller 20 calculates the position and the shape of patterns of respective colors from the histogram data in the main and sub scanning directions (5), and the histogram data are stored in a temporary memory (RAM's 603, 604 in the present embodiment) (6). Then there is discriminated whether the position and shape of the patterns of respective colors have been determined and stored in the memory, for N sets (7). In the following there will be explained a case of N=n, but data may be collected for plural rotations of the photosensitive drum (N>n) in consideration of the eventual error. If said discrimination turns out negative, the steps (4) to (6) are repeated. If said discrimination turns out affirmative, the histogram data of the main and sub scanning directions of N sets are read from the RAM's 603, 604 (8), and are supplied through the bus controller 607 to the system controller 21 shown in FIG. 3, which further transfers said data through the CPU bus $\beta 530$ to an unrepresented CPU for calculating registration error data (misregistration data) Di(M, C, Y, BK) (9).

Then, from N registration error data from each color, a maximum value MAX and a minimum value MIN are determined (10). Then, in order to avoid the error in the image pattern reading, there are calculated (N−1) differences between said maximum value MAX and other registration error data Di, and there is discriminated whether said (N−1) differences are all larger than a predetermined value k (11). If all the (N−1) differences are larger than k, the maximum value MAX is identified as an error in the image pattern reading and is omitted from the registration error data (12).

On the other hand, if any of (N−1) differences between the maximum value MAX and other registration error data Di is smaller than the predetermined value k, said maximum value MAX is retained.

Then, in order to avoid the error in the image pattern reading, there are calculated differences between said minimum value MIN and other registration error data Di, and there is discriminated whether said (N−1) differences ((N−2) differences in case the maximum value MAX is omitted) are all larger than a predetermined value k (13). If all the (N−1) or (N−2) differences are larger than k, the minimum value MIN is identified as an error in the image pattern reading and is omitted from the registration error data (14).

On the other hand, if any of (N−1) or (N−2) differences between the minimum value MIN and other registration error data Di is smaller than the predetermined value k, said minimum value MIN is retained.

Then the registration error data Di, in a number N for each color, after the retention or omission of the maximum value MAX and the minimum value MIN, are averaged (15). Subsequently the timing correction data in the sub scanning direction are calculated for each color image signal (16), and are set in combination with the timing correction data for the main scanning direction (17), whereby the start timings of image writing in the main and sub scanning directions are set. Thus the registration correcting process is completed.

In the above-explained embodiment, density histograms in the main and sub scanning directions are prepared from the digital signals $\beta 505$, $\beta 506$ obtained by processing on the data read by the reading unit equipped with the CCD sensors 10a, 10b, thereby reducing the memory capacity required for correction of registration and increasing the speed of data processing, thus recognizing registration correcting patterns of plural sets within a rotation of the photosensitive drum. However similar effects can also be obtained by a configuration shown in FIG. 10, in which the read and processed digital signals $\beta 505$, $\beta 506$ are compared with a predetermined value, whereby the density level of each pixel is binary digitized and stored.

Figure 10:
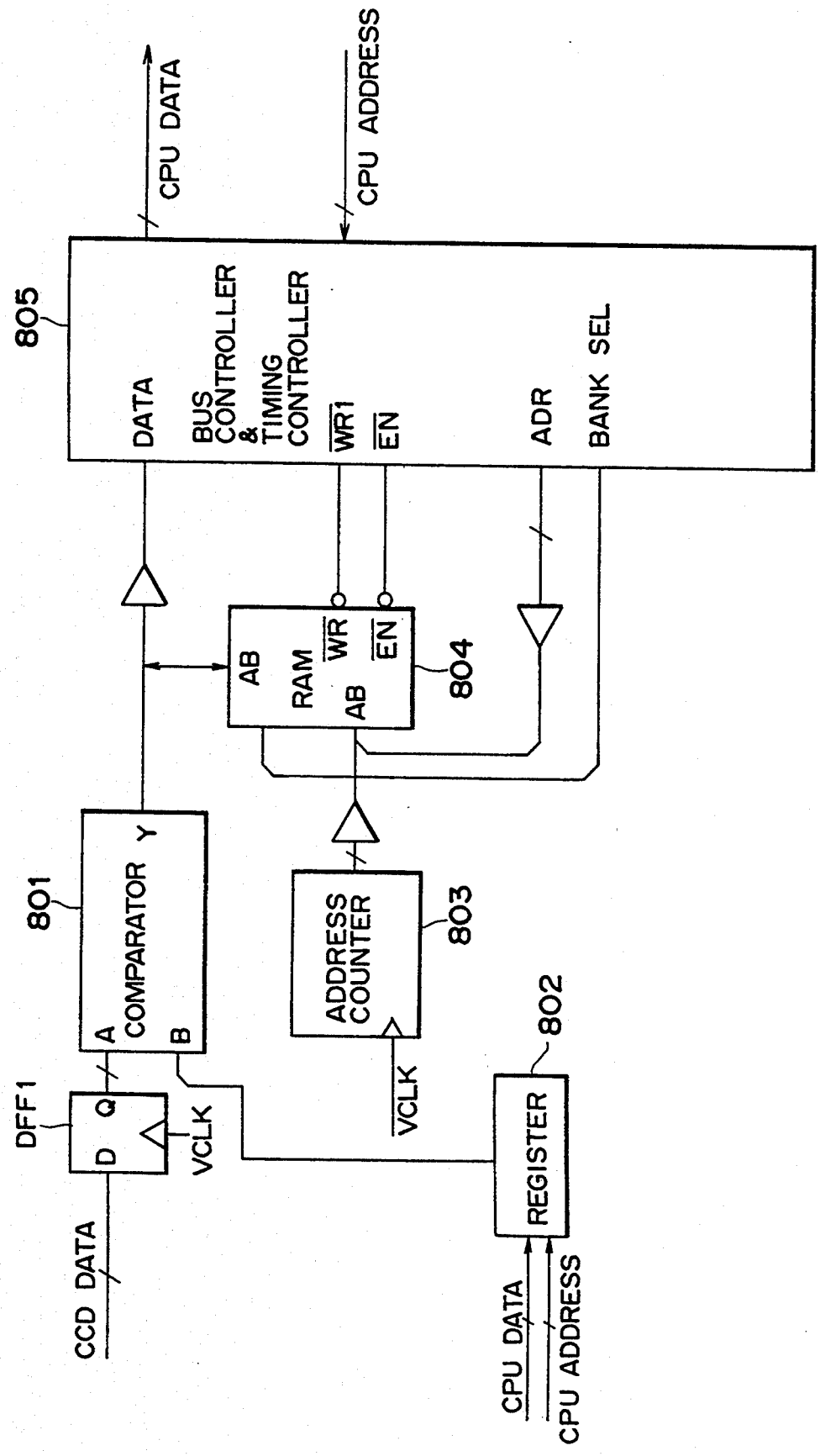
FIG. 10 is a detailed block diagram showing another configuration of the principal part of the registration controller shown in FIG. 3.

FIG. 10 is a detailed block diagram showing another configuration of the principal part of the registration controller 20 shown in FIG. 3.

In FIG. 10 there are shown a data latch DFF1 for latching for example the digital signal $\beta 505$; a register 802 for memorizing a binarizing level set by an unrepresented CPU; an address counter 803 for indicating the writing address for a RAM 804 by pixel clock signals VCLK; a bus controller 805 for releasing various timing signals and a bank selection signal BANKSEL; and a comparator 801 for comparing the binarizing level set in the register 802 with the multi-value digital signal $\beta 505$ of each pixel latched by the data latch DFF1, thereby releasing a binarized signal for each pixel.

The digital signal $\beta 505$, obtained by reading the registration correcting patterns transferred onto the transfer belt 1, is latched in the data latch DFF1 and released to the comparator 801, in which said digital signal is converted into a binary signal for each pixel, through comparison with the binarizing level set in the register 802. Said binary signal is written into the RAM 804 according to the writing address instructed by the address counter 803. In the RAM 804, the binarized data corresponding to the image pattern reading area A1 indicated by broken lines in FIG. 4 are stored in the banks set for n sets of respective colors (memory spaces being switched by the bank selection signal BANKSEL released from the bus controller 805).

Consequently the memory capacity of the RAM 804 can be made sufficiently small, and the process time can be made shorter and is almost same as that in the foregoing embodiment, even in case the data are transferred through the bus controller 607 to the system controller 21 shown in FIG. 3, and further through the CPU bus $\beta 530$ to the unrepresented CPU for the calculation of the registration error data Di (M, C, Y, BK).

Figure 11:
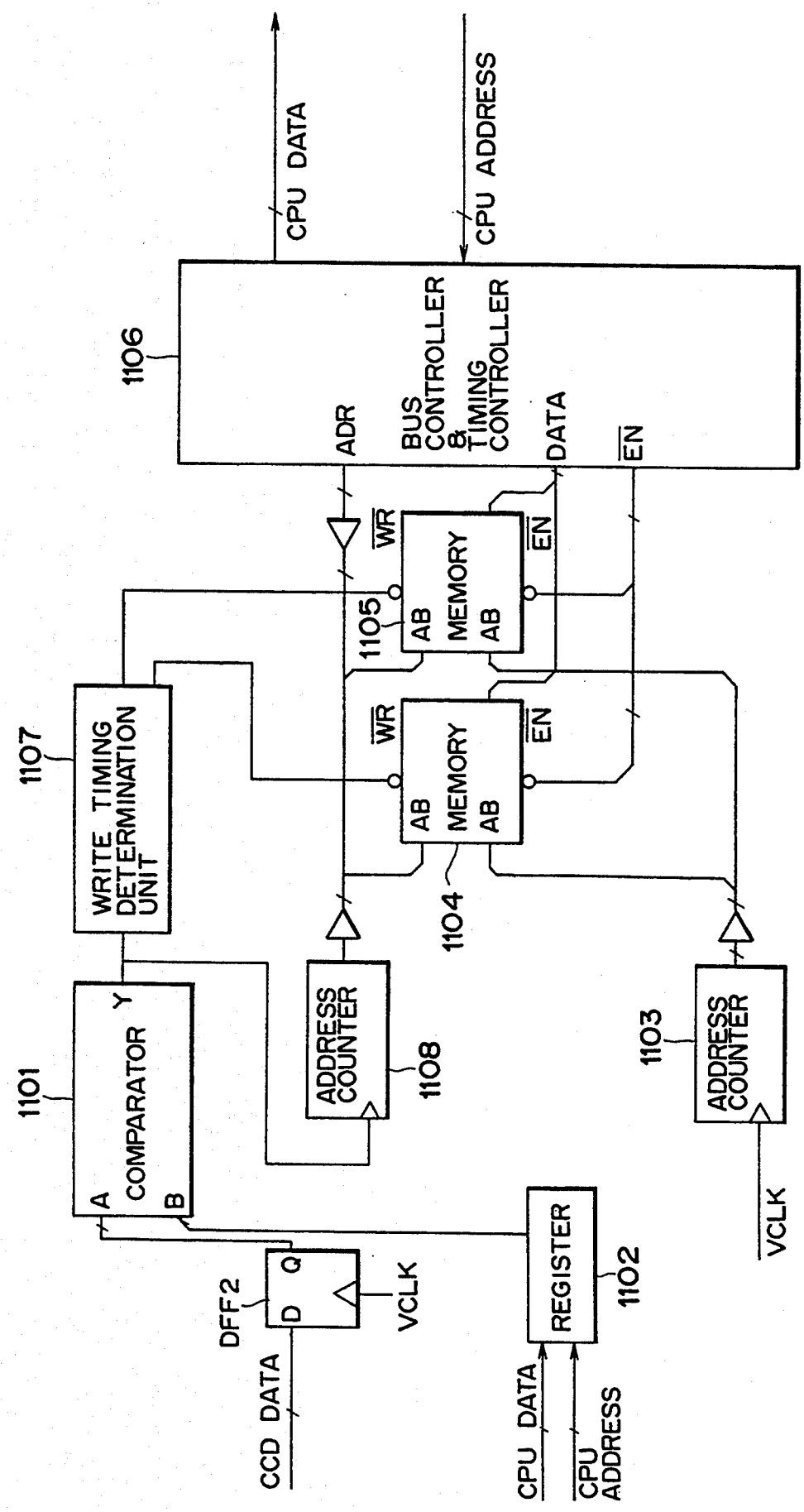
FIG. 11 is a detailed block diagram showing still another configuration of the principal part of the registration controller shown in FIG. 3.

In the foregoing embodiment, the memory capacity required for pattern data for calculating the registration error is reduced by comparing the read and processed digital signals β505, β506 with the predetermined value and storing thus binarized density level of each pixel in the RAM 804, but similar effects can be expected also in a configuration shown in FIG. 11, in which the shape of pattern data is considered and the position information of the registration error detecting patterns is memorized by fetching the points of variation of said patterns on the transfer belt 1.

FIG. 11 is a detailed block diagram of still another configuration of the principal part of the registration controller 20 shown in FIG. 3.

In FIG. 11 there are shown a data latch DFF2 for latching for example the digital signal β505; a register 1102 for retaining a reference value to be set in a comparator 1101 by the unrepresented CPU; an address counter 1103 for supplying the data input terminals DB of memories 1104, 1105 with position information (address) indicating the point of variation in the registration error detecting pattern and the transfer belt 1 in consideration of the shape of pattern data; a write timing determination unit 1107 for sending a write enable signal to the memories 1104, 1105 in response to the output of the comparator 1101; and a bus controller 1106 for releasing various timing signals and a band selection signal.

The digital signal β505 obtained by reading the registration correcting patterns transferred onto the transfer belt 1 is latched in the data latch DFF2 and is supplied to the comparator 1101, in which said signal is compared with the value of the register 1102 set by the unrepresented CPU. The output of said comparator 1101 indicates the points of variation of the data of the registration correcting pattern and the transfer belt 1. For example, the pattern shown in FIG. 4 has two points of variation, and the values of the address counter corresponding to said points of variation, namely the position information of the pattern, are stored in the memories 1104, 1105. The writing into said memories 1104, 1105 is effected by enabling the writing into said memories by a one-shot pulse signal from the write timing determination unit 1107 in response to the output from the comparator 1101. The addresses for the memories 1104, 1105 are counted up, corresponding to the point of variation of the pattern, by the supply of the output of the comparator 1101 to the address counter 1108. The data on the position and shape of the pattern, thus obtained, are read from the memories 1104, 1105, then supplied through the bus controller 1106 to the system controller 21 shown in FIG. 3, and further supplied through the CPU bus β530 to the unrepresented CPU, for the calculation of the registration error data Di (M, C, Y, BK).

In this manner the position and shape of the pattern can be recognized with a reduced memory capacity and with a reduced process time. For example, in case of a reading area of 256 pixels times 256 lines or of 65536 bytes, the conventional technology requires a memory capacity equal to said 65536 bytes times the number of colors (4 colors in the present embodiment) times the number of sensors (2 sensors in the present embodiment), or 65536×4×2=524288 bytes. Also in case of formation of such patterns in n sets, there is required a memory capacity of 524288 bytes×n. On the other hand, according to the present invention, there is only required a memory capacity of (256 bytes (for storing the histogram data in the main scanning direction)+256 bytes (for storing the histogram data for the sub scanning direction))×4×2×n, or 4 n Kbytes in total. In simple comparison, this corresponds to a capacity reduction of 4/512 or 1/128.

Figure 12:
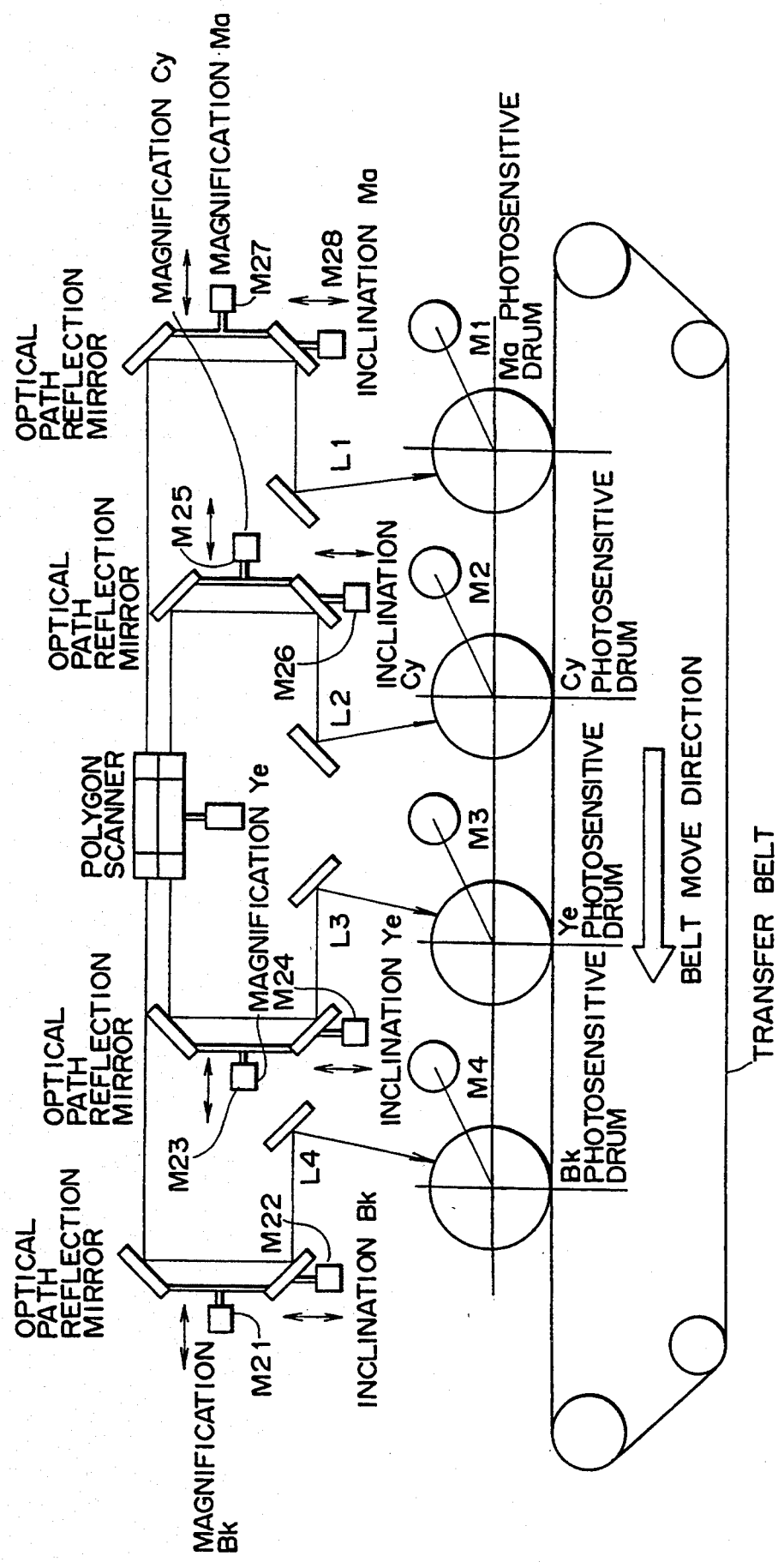
FIG. 12 is a view for explaining correction for the magnification and inclination of image.

FIG. 12 is a view for explaining the correction for magnification and inclination of the image.

In the laser scanning paths M, C, Y, BK, there are respectively provided mirror units for deflecting the optical paths, thereby irradiating the photosensitive drums with the laser beams L1–L4 and forming latent images on said drums.

Said mirror units are respectively provided with magnification correcting motors M21, M23, M25, M27 and inclination correcting motors M22, M24, M26, M28, in order to correct the magnification and inclination of the latent images formed on the photosensitive drums. The magnification is regulated by varying the optical path length by the movement of mirrors in a direction indicated by an arrow, by the magnification correcting motor. Also the inclination is corrected by the movement of the front side of the mirror unit, by the inclination correcting motor, while the rear side of said mirror unit being fixed.

As explained in the foregoing, the image forming apparatus of the present invention comprises plural imaging stations including image forming means positioned around endless image bearing members moved by plural image bearing member drive systems; a transport member for transporting a recording material in succession in a predetermined direction by plural transport member drive systems; pattern formation means for causing image forming means, provided in each imaging station, to form, on the transport member transported during a rotation of each image bearing member, registration correcting marks of plural sets or corresponding to plural rotations at predetermined timings; reading means for reading the registration correcting marks of plural sets or corresponding to plural rotations, transferred onto the transport member by said pattern forming means; calculation process means for applying a predetermined calculation process to the read data of the registration correcting marks of plural sets or corresponding to plural rotations released from said reading means; memory means for storing the result of calculation by said calculation process means, for each imaging station; and correction means for mechanically or electrically correcting the registrations of the imaging stations by analyzing the result of calculation stored in said memory means. It is therefore rendered possible, even with a limited memory capacity, to exactly calculate the information on the registration errors of the image bearing members without the influence of unevenness in the rotation of the image bearing members, thereby precisely correcting the registration errors thereof.

The present invention is not limited by the foregoing embodiments, but is subject to various modifications within the scope and spirit of the appendec claims.

What is claimed is:

1. An image forming apparatus comprising:
   plural imaging stations including image forming means positioned around endless image bearing members;
   a transport member for transporting a recording material in succession in a predetermined direction;
   pattern forming means for causing said image forming means in each imaging station to form, on said transport member transported during rotation of each image bearing member, plural sets of registration correcting marks at predetermined timings;

reading means for reading the plural sets of registration correcting marks transferred onto said transport member by said pattern forming means;

storage means for storing data relating to the plural sets of registration correcting marks for each of said imaging stations read by said reading means;

calculation process means for applying a predetermined calculation process to the data relating to the plural sets of registration correcting marks stored in said storage means; and correction means for mechanically or electrically correcting the registration of each of said imaging stations based on the result of calculation by said calculation process means.

2. An apparatus according to claim 1, wherein said calculation process means executes an average process of the read data.

3. An image forming apparatus according to claim 1, wherein said imaging station is adapted to form an image on the image bearing member by an electrophotographic process employing a laser beam.

4. An image forming apparatus according to claim 3, wherein said correction means is adapted to correct the start timing of image writing by said laser beam.

5. An image forming apparatus according to claim 3, wherein said correction means includes an optical system related to said laser beam, and means for moving said optical system.

6. An image forming apparatus according to claim 1, wherein said pattern forming means is adapted to form registration correcting marks of a number of sets corresponding to plural rotations of the image bearing member.

7. An image forming apparatus comprising:

a plurality of image forming means for forming an image onto an image bearing member common to plural image forming means;

means for generating a predetermined pattern data;

means for causing each of said plurality of image forming means to form plural sets of registration marks on the common image bearing member;

means for reading the plural sets of registration marks on the common image bearing member;

means for applying a calculation process to each set of the data read by said reading means;

a memory for storing the result of calculation by said calculation process means; and means for correcting registration of the plural image forming means based on the result of calculation stored in said memory, wherein said reading means performs a reading operation for each of the plural sets of patterns formed by said plural image forming means on said common image bearing member based on said predetermined pattern data, and said calculation process means performs the calculation process for each of the plural sets of patterns read by said reading means in parallel, and said correcting means corrects the registration of the plurality of image forming means after the calculation process on the plural sets of the patterns is performed.

8. An image forming apparatus according to claim 7, wherein said calculation process means is adapted to store, as the result of calculation, data relating to histograms of data from said reading means, in said memory.

9. An image forming apparatus according to claim 7, wherein each of said image forming means includes an image bearing drum, and the images formed on said image bearing drums are transferred onto a common image bearing member.

10. An image forming apparatus according to claim 9, wherein said image forming means is adapted to form an image on the image bearing drum by an electrophotographic process employing a laser beam.

11. An image forming apparatus according to claim 10, wherein said correction means is adapted to correct the start timing of image writing by said laser beam.

12. An image forming apparatus according to claim 10, wherein said correction means includes an optical system relating to said laser beam, and means for driving said optical system.

13. An image forming apparatus according to claim 9, wherein said pattern data generating means is adapted to generate plural pattern data, corresponding to a rotation of said image bearing drum of each of the image forming means.

14. An image forming apparatus according to claim 13, wherein said pattern data generating means is adapted to generate pattern data of a number corresponding to plural rotations of said image bearing drum of each of the image forming means.

15. An image forming apparatus according to claim 7, wherein said apparatus is a color image forming apparatus, and the image forming means are adapted to form images of respective color components.

16. An image forming apparatus comprising:

plural image stations for forming images on a recording medium;

pattern formation means for causing said plural image stations to respectively form plural sets of registration correction marks on said recording medium;

read means for reading the plural sets of registration marks formed on said recording medium;

storage means for storing data relating to the plural sets of registration correction marks respectively formed by said plural image stations and read by said read means;

process means for executing a predetermined process for the data relating to the plural sets of registration correction marks stored in said storage means; and correction means for correcting registrations of said plural image stations on the basis of processed results by said process means.

17. An apparatus according to claim 16, wherein said correction means mechanically or electrically corrects the registration of an image station other than a predetermined image station, in said plural image stations.

18. An apparatus according to claim 17, wherein said image station forms an image on said recording medium through an electrophotographic process using a laser beam.

19. An apparatus according to claim 18, wherein said correction means corrects an image write timing of the laser beam.

20. An apparatus according to claim 18, wherein said correction means comprises an optical system relating to the laser beam and movement means for moving said optical system.

21. An apparatus according to claim 16, wherein each of said plural image stations comprises an endless-moving image bearing member, and said pattern formation means forms the plural sets of registration correction marks on said recording medium at a predetermined timing, during a rotation of said image bearing member.

22. An apparatus according to claim 21, wherein said pattern formation means forms the plural sets of registration correction marks corresponding to plural rotations of said image bearing member.

23. An apparatus according to claim 16, wherein said process means executes an average process to the data relating to the plural sets of the registration correction marks of each said image station stored in said storage means.

24. An apparatus according to claim 16, wherein said recording medium includes a transport member for transporting a recording material, and said pattern formation means forms the plural sets of registration correction marks on said transport member.

25. An image forming apparatus comprising:
plural image formation means for forming images on an image recording medium;
pattern formation means for causing said plural image formation means to form plural sets of registration correction marks on said recording medium;
read means for reading the plural sets of registration correction marks formed on said recording medium;
process means for executing a predetermined process to data relating to the plural sets of registration correction marks read by said read means;
storage means for storing a processed result of each of the plural sets of registration correction marks; and
correction means for correcting registrations of said plural image formation means on the basis of the processed result stored in said storage means,
wherein the read operation by said read means to read the plural sets of registration correction marks formed on said recording medium and the process operation by said process means to process the data relating to the plural sets of registration correction marks read by said read means are performed in parallel with each other.

26. An apparatus according to claim 25, wherein said process means obtains a histogram of the data relating to each of the plural sets of registration correction marks from said read means and outputs the obtained histogram as the processed result.

27. An apparatus according to claim 26, wherein said recording medium includes a transport member for transporting a recording material and said pattern formation means forms the plural sets of registration correction marks on said transport member.

28. An apparatus according to claim 27, wherein said correction means mechanically or electrically corrects the registration of image formation means other than predetermined image formation means, in said plural image formation means.

29. An apparatus according to claim 28, wherein said image formation means forms an image on said recording medium through an electrophotographic process using a laser beam.

30. An apparatus according to claim 29, wherein said correction means corrects an image writing timing of the laser beam.

31. An apparatus according to claim 30, wherein said correction means comprises an optical system relating to the laser beam and movement means for moving said optical system.

32. An apparatus according to claim 25, wherein each of said plural image formation means has an endless-moving image bearing member, and said pattern formation means forms the plural sets of registration correction marks on said recording medium at a predetermined timing during a rotation of said image bearing member.

33. An apparatus according to claim 25, wherein said apparatus is a color image formation apparatus and said image formation means forms respective color components.

34. An image forming method comprising:
an image formation step of forming images on a recording medium by plural image stations;
a pattern formation step of causing the plural image stations to respectively form plural sets of registration correction marks on the recording medium;
a read step of reading the plural sets of registration correction marks formed on the recording medium;
a storage step of storing data relating to the plural sets of registration correction marks respectively formed by the plural image stations in said image formation step and read in said read step;
a process step of executing a predetermined process to the data relating to the plural sets of registration correction marks stored in said storage step; and
a correction step of correcting registrations of the plural image stations on the basis of processed results in said process step.

35. A method according to claim 34, wherein said correction step mechanically or electrically corrects the registration of an image station other than a predetermined image station, in the plural image stations.

36. A method according to claim 35, wherein, in said image formation step, the image station forms an image on the recording medium through an electrophotographic process using a laser beam.

37. A method according to claim 34, wherein said process step executes an average process to the data relating to the plural sets of the registration correction marks of each image station stored in said storage step.

* * * * *

UNITED STATES PATENT AND TRADEMARK OFFICE
CERTIFICATE OF CORRECTION

PATENT NO. : 5,452,073

DATED : September 19, 1995

INVENTOR : Tatsuhito Kataoka

It is certified that error appears in the above-identified patent and that said Letters Patent is hereby corrected as shown below:

COLUMN 1

Line 32, "drums, memory" should read --drums, onto the recording sheet supported on the transfer belt, because of the error in the mechanical mounting of the respective photosensitive drums, the error in the optical path lengths of the respective laser beams, the variation in the optical paths etc. For this reason it has been conceived to effect correction by forming registration correcting pattern images on the transfer belt from the respective photosensitive drums and reading said pattern images for example with a CCD sensor. The correction for the variation in the optical path length or in the optical path can be achieved by calculating the registration errors on the photosensitive drums and electrically correcting the image signals to be recorded and/or driving mirrors provided in the optical paths of the laser beams.
More specifically, the error in registration of the different colors is obtained by reading the registration correcting pattern images, formed on the transfer belt, by means of the CCD sensor, storing the obtained pattern image data in a memory, and effecting calculation on the pattern images stored in said memory. Consequently, in case of forming plural registration correcting pattern in a turn of the photosensitive drum for the purpose of eliminating wow and flatter components in the rotation thereof, it is required to read and store such plural images in the memory. For this reason there is required an enormous memory--;

Line 59, "onto the" should be deleted; and
Lines 60-68 should be deleted.

UNITED STATES PATENT AND TRADEMARK OFFICE
CERTIFICATE OF CORRECTION

PATENT NO. : 5,452,073

DATED : September 19, 1995

INVENTOR : Tatsuhito Kataoka

Page 2 of 2

It is certified that error appears in the above-identified patent and that said Letters Patent is hereby corrected as shown below:

COLUMN 2

Lines 1-17 should be deleted; and
   Line 18, "required an enormous" should be deleted.

IN THE DRAWINGS

Sheet 5, Figure 5, "RATTERN" should read --PATTERN--; and
   Sheet 9, Figure 9, "CALCULAE" should read --CALCULATE--.

Signed and Sealed this

Twelfth Day of March, 1996

Attest:

BRUCE LEHMAN

*Attesting Officer*      *Commissioner of Patents and Trademarks*